(12) United States Patent
Johnard et al.

(10) Patent No.: US 6,251,330 B1
(45) Date of Patent: Jun. 26, 2001

(54) METHOD AND DEVICE FOR MANUFACTURING PLASTIC-BASED MATERIALS IN WEB FORM, SUCH AS FLOOR AND WALL COVERING MATERIALS, AND ALSO SUCH MATERIAL MANUFACTURED BY THE METHOD

(75) Inventors: Bengt Otto Johnard, Gothenburg; Per Anders Fredrik Linden, Askim; Lasse Ryde, Ravlanda, all of (SE)

(73) Assignee: Forbo International SA (CH)

( * ) Notice: Subject to any disclaimer, the term of this patent is extended or adjusted under 35 U.S.C. 154(b) by 0 days.

(21) Appl. No.: 09/284,759

(22) PCT Filed: Oct. 13, 1997

(86) PCT No.: PCT/IB97/01261

§ 371 Date: Jun. 10, 1999

§ 102(e) Date: Jun. 10, 1999

(87) PCT Pub. No.: WO98/17455

PCT Pub. Date: Apr. 30, 1998

(30) Foreign Application Priority Data

Oct. 17, 1996 (SE) .................................... 9603812

(51) Int. Cl.[7] .......................... B29C 35/10; B29C 43/22; B29C 43/52

(52) U.S. Cl. ........................ 264/462; 264/109; 425/174.4; 425/224; 425/363; 425/447

(58) Field of Search .................................... 264/109, 462; 425/174.4, 224, 363, 447; 428/338

(56) References Cited

U.S. PATENT DOCUMENTS

| 2,962,081 | 11/1960 | Dobry et al. . |
| 4,978,069 | * 12/1990 | Andersson et al. . |
| 5,407,617 | * 4/1995 | Oppermann et al. . |

FOREIGN PATENT DOCUMENTS

| 1956038 | 5/1971 | (DE) . |
| 3841560 | 6/1990 | (DE) . |
| 226946 | 7/1987 | (EP) . |

* cited by examiner

Primary Examiner—Leo B. Tentoni
(74) Attorney, Agent, or Firm—Ostrolenk, Faber, Gerb & Soffen, LLP

(57) ABSTRACT

Method and device for manufacturing plastic-based materials in web form, such as floor and wall covering materials, and also such a material manufactured by the method. During the production, spherical particles (12) in substantially one size are used. The particles are deposited as a layer (18) on a substrate (1) by doctoring by means of allowing the particle mass to flow down into a gap between a depositing member (16) and the passing substrate (1). Thereafter, the particles are sintered together by heating, whereafter the solidified layer (25) is caused to fuse into a homogenous form by means of heating during simultaneous compression in order to shape the web material (26).

12 Claims, 1 Drawing Sheet

METHOD AND DEVICE FOR MANUFACTURING PLASTIC-BASED MATERIALS IN WEB FORM, SUCH AS FLOOR AND WALL COVERING MATERIALS, AND ALSO SUCH MATERIAL MANUFACTURED BY THE METHOD

TECHNICAL FIELD

The present invention relates to a method and a device for manufacturing plastic-based materials in web form, such as floor and wall covering materials, and also such covering material manufactured by the method.

BACKGROUND OF THE INVENTION

It is previously known to manufacture covering material in the form of long webs, which are delivered in the form of rolls in order to be laid out on floors or in order to be put up as wall covering. The covering material referred to here consists of a plastic layer, which may extend through the whole thickness of the material or, as is often the case, which is carried by a substrate such as fibre web of glass fibre or of other fibre. In the most common commercial products, the plastic layer consists of polyvinyl chloride, PVC. One reason why this material has been selected to such a great extent is that it can be treated during manufacture with methods which in many respects are rational. Accordingly, PVC in the form of a plastisol may be applied onto a substrate with the help of a doctor blade by means of which a layer of the plastisol, with an adapted thickness, is applied onto the substrate passing the doctor blade. As suggested, the substrate may be included in the product or constitute a part of the manufacturing equipment and thereby not be integrated into the product. After the application, the plastisol may be gelled to such a solid form that the surface may be pattern printed or be subjected to other finishing treatment in order to achieve decorative effects. Finally, the PVC-layer is cured by means of heating. If a material in foam form is thereby desired, this may be achieved by means of using the plastisol with an addition of blowing agent. Thereby, it is also possible to provide the surface with a relief. Accordingly, it is possible to manufacture materials within a wide spectre with different character and appearance by means of this relatively simple manufacturing method Despite the fact that PVC has very good processing properties and also properties in use, attempts have been made during recent years to replace this material with other plastic materials. The motive for this are environmental reasons. During combustion PVC forms, inter alia, corrosive hydrogen chloride.

When attempting to replace PVC in products such as, typically, surfacing materials, which are manufactured in long webs, manufacturing methods have been sought, which are not particularly aimed at the use of plastisol but which allow a wider range when choosing the material. Thereby, it has been an objective to make it possible to use so-called olefines as a manufacturing material. Amongst such material groups polyethylene and polypropylene may be mentioned. Due to its flexibility the material in products manufactured from these plastic types does not have to be mixed with plasticizers, and in the final destruction primarily water and carbon dioxide are formed during combustion, which give a low environmental impact.

These materials, however, are not transformable to a paste in the same way as PVC, which can be used for coating a base layer in the previously described way. Where the materials which are desirable for replacing PVC are concerned, one is obliged to resort to thermic manufacturing processes such as extrusion and calendering, which require large investments in machinery. In order to find a more advantageous alternative, it is suggested in U.S. Pat. No. 5,407,617 (Oppermann et al) to apply the plastic material in the form of particles onto a passing substrate by means of scattering. In this context, this forms means that the particles are fed out from a depository intended therefor by means of an actuator to enable them to fall freely from the actuator and down onto the substrate. Thereby, the particles form a layer on the substrate, the thickness of which may be adjusted by means of the transportation speed of the substrate and the feeding capacity of the scattering device. In the subsequent steps, the layer is stabilized by means of the particles being sintered together during moderate heating. In a further step, the layer is thereafter given its solid shape by means of cylinders heated to a higher temperature. According to the publication, decorative effects may be achieved by means of processing such as printing, relief formation or in another way.

The method of scattering a powder offers great possibilities to choose from different polymer types. However, the method causes considerable difficulties when it comes to achieving a reliable result. A number of different factors may disturb the deposition of the particles on the substrate, so that an uneven layer thickness is obtained, and it is particularly difficult to obtain the same layer thickness across the entire width of the web without obtaining thinning or bulging at the edges of the web. The difficulties become even greater if there is a desire to achieve decorative effects by means of a mixture of particles, particularly if these have different size and shape. Therefore, the method results in severe limitations to the choice of pattern.

SUMMARY OF THE INVENTION

The object of the invention is to provide a method for manufacturing a covering material in web form without requiring complicated equipment for thermic treatment, and without the earlier mentioned difficulties which the scattering method involves, and also without limitation to plastic types such as PVC. Accordingly, by means of the invention with particles as a starting material and using simple equipment, a uniform layer of the particles may be achieved, which in the following step may be sintered and fused together in order to form a homogeneous layer. Furthermore, the method enables the insertion of particles of a different shape and size in order to achieve decorative effects.

According to the invention, this is achieved by means of giving the particles the shape of spherical granules, which are present in only one or a few sizes, well delimited from each other. Thereby, the property of a mass of spherical particles, to flow nearly as a liquid, may be utilized for distributing the particles during the deposition of the layer.

BRIEF DESCRIPTION OF THE DRAWINGS

In the following an embodiment of the invention will be described, which is illustrated by means of a schematic view of the device for carrying out the method and sectional views of the plastic layer. Thereby.

DETAILED DESCRIPTION OF PREFERRED EMBODIMENTS

There are a number of previously known methods for manufacturing spherical micro-particles. In such a method, for example according to U.S. Pat. No. 4,978,069 (Anderson et al), this is done by means of forming droplets from a melt of the material, which droplets in their free form adopt a spherical shape. Also other methods occur, which are based on extrusion of the plastic material. It has been discovered that a mass of such spherical micro-particles as a mass move considerably differently from a mass of particles produced in the hitherto predominantly used method, by means of crushing material in a solid state. Thereby, the particles obtain a rugged shape and will, furthermore, be present in a series of fractions, from which those which have dimensions above a certain size may be screened out, but where still the remainder comprises a graduation from the largest after the screening down to "dust-size". The differences lie in that the mass of spherical particles, and particularly if these have the same size within a small interval, becomes very mobile and nearly resembles a liquid. Accordingly, the mass has considerably smaller angle of repose when piled in a heap than a mass consisting of crushed particles has. The particles can also more easily be packed into a compact mass, also solely with the aid of gravity: the "shaken volume weight" becomes higher than in the case of crush-particles.

These properties, and particularly the first-mentioned, have primarily been utilized in order to make the particle mass easily transportable by pumping. Thereby, its property of being able to behave as a liquid is thus utilized. Where a mass of crush-particles is concerned, on the other hand, transportation must take place by means of screw feeding or corresponding methods.

The basis of the invention is to use as a raw material particles of a plastic material, or a mixture of several plastic materials, with the absolute majority of the particles being spherical. Preferably, the bulk of the particles have the same dimension within a narrow range; however it is not excluded that particles of several dimensions may occur, however only a few fractions and in dimensions which are not too close to each other. With plastic material is herein meant that the particles separately may consist of a pure polymer or copolymer, but the particles preferably also contain dye-stuffs such as pigments and possibly additives for affecting the flowability during the fusion of the particles and/or the curing course when the particle mass is solidifying.

Figure 1:
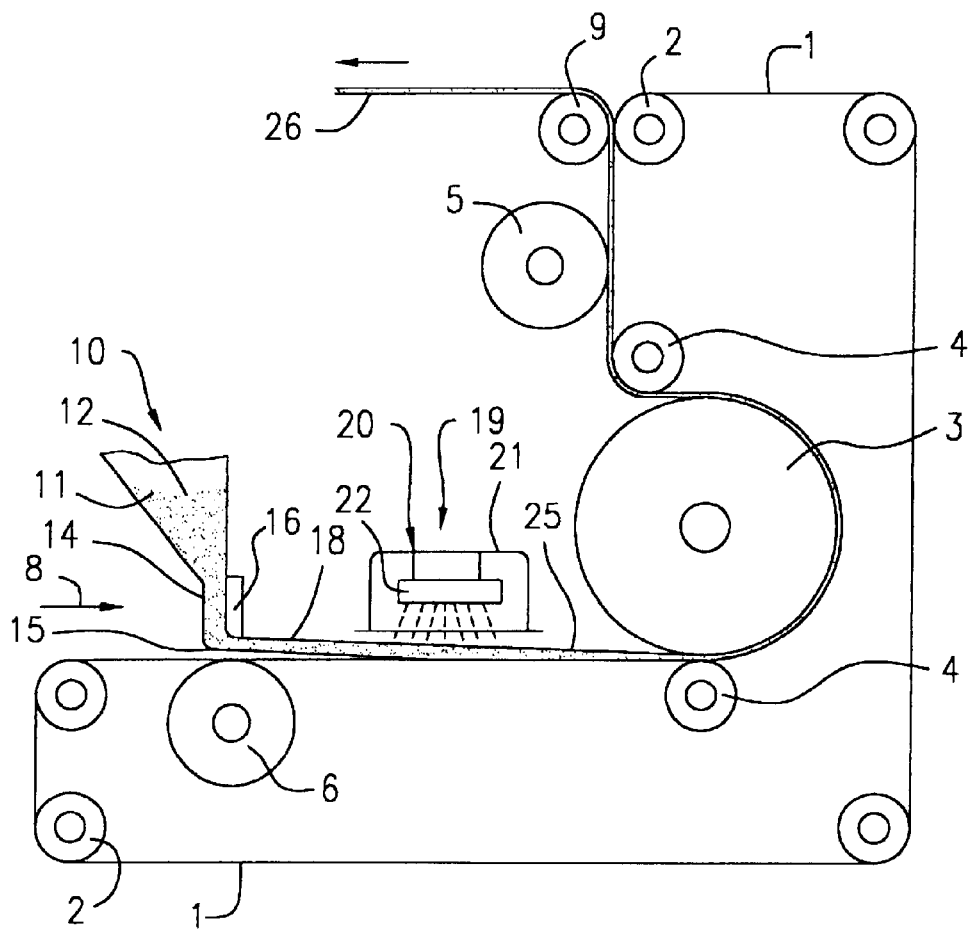
FIG. 1 shows the schematic view of the device.

In FIG. 1, a device for carrying out the method is schematically shown. The device, a production machine for material in web-form, comprises a substrate 1 onto which the material is to be formed. The substrate is constituted by an endless belt, which is tightly stretched over a number of conducting rollers 2 and travels around a cylinder 3 while being pressed around a portion of its periphery by means of pressure rollers 4. The belt 1, which forms the substrate, may be constituted of steel or, for example, a belt with a surface of tetrafluoroethylene, which provides a good release action against the formed material web. The substrate will not be part of the finished product, but constitutes a machine component. The cylinder 3 is heated. A further cylinder 5 bears on the substrate. The cylinder 5 is intended to be maintained at a relatively low temperature, it will serve as a cooling cylinder. Furthermore, there is a supporting cylinder 6. The substrate is intended to travel in the direction of the arrow 8 and will, consequently, after having been deflected by means of two of the conducting rollers 2, pass over the supporting cylinder, between one of the pressure rollers 4, around a portion of the heated cylinder 3 over the second pressure roller 4, past the cooling cylinder 5, and once more be deflected around one of the conducting rollers 2 and further over additional such rollers, in order to again reach the supporting cylinder 6.

Above the supporting cylinder 6, there is a particle feeding device 10, which comprises a trough 11 arranged for reception of the particle mass, which thereby is denoted with 12. Accordingly, the particle mass consists of spherical particles of the plastic composition, which the finished material web is to consist of. A not shown refilling device for the particle mass should be present in order to maintain a sufficient material amount in the trough 2. This refilling device may, according to what has become evident from the preceding description, have the form of a pump system from a larger container for the particle mass, or from a manufacturing equipment for continuous production of the particles.

The trough 11 discharges into a wedge-shaped bottom portion 14. This opens up downwards through a gap 15. The gap should have such a length that it extends across the full width of the web which is to be produced. The gap terminates in a depositing ruler 16.

The depositing ruler or the doctor blade 16 should be located with its lower edge at such a distance above the substrate 1, resting on the supporting cylinder 6, that it corresponds to the desired thickness of the particle mass which is deposited on the substrate during its movement in the direction of the arrow 8. As will become evident later, this thickness should be larger than the intended thickness for the finished material. As an alternative to the depositing ruler 16, a counter-rotating roller may be arranged, which has its lower periphery at said distance from the substrate. This lower periphery should, accordingly, rotate in the opposite direction to the arrow 8. The roller is preferably provided with a stripper inside the trough 11. Due to its counter-rotation, the roller is not a device for feeding out the particle mass, but is arranged in order to form the gap which the mass is to flow out through, something which is not prevented by the rotation of the roller if it has a smooth, glossy surface. The reason for arranging a counter-rotating roller instead of a ruler is that particles may deposit and adhere to the ruler, which particles accordingly form tracks in the deposited particle layer. For a roller, this is prevented by always keeping the surface which meets the particle mass clean by means of the stripper. Other alternatives for depositing devices may also exist.

After the particle feeding device 10, counting in the direction of the arrow 8, a layer of particle mass is thus deposited, which is denoted 18 in the figure. This layer will be brought in a direction towards the heated cylinder 3, together with the travelling substrate 1. Between the particle feeding device 10, and the gap between the cylinder 3 and the lower pressure roller 4, there is a horizontal region 19 of the substrate. A heating device 20 is located over a portion of this region. The heating device is conveniently constituted by a hood 21, open downwards, which encloses sources for irradiation of the underlying area with infrared light, thus heat radiation.

Preceding the heating device 20, accordingly between this and the particle feeding device 10, further devices may be present and particularly such devices which are intended to achieve a patterning of the web. It will later be described how this can be accomplished.

The realization of the method, using the described device, will now be described herein:

The particle mass 12, consisting of particles of the predetermined composition and sizes, is produced and fed to the trough 11, so that it always contains a sufficient quantity for output during the intended production. Due to the spherical shape of the particles, the mass flows down through the bottom portion 14 and out through the gap 15. In order to reliably ensure output through the gap, the tray can be provided with a vibrator or an agitator in order to maintain the particle mass in a certain movement. The discharged particle mass will end up on the substrate 1, which is transported in the direction of the arrow 8 by means of the rotation of the cylinders; the cylinder 3 is preferably driven. The depositing ruler 16 ensures that a uniform layer of the particle mass is deposited on the substrate. Because of the flowability of the mass, there is no risk that the mass forms a non-uniform layer, or builds up in front of the depositing ruler.

Figure 2:
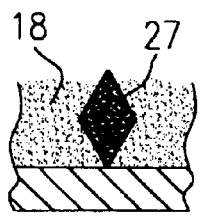
FIGS. 2, 3 and 4 show enlarged sectional views of the structure of the plastic layer in different method steps.
Figure 3:
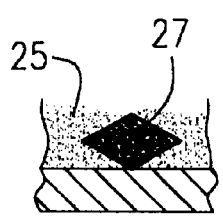

The now formed layer of particles, which still are freely movable in relation to each other, and which in FIGS. 1 and 2 are denoted with 18, are now brought in under the heating device 20. The heat in this is adapted not to melt the material other than in the granule boundaries, so that a consolidated but still slightly porous layer is formed on the substrate 1. This layer is denoted 25, compare the representation of the layers 18 and 25 in FIGS. 2 and 3, respectively.

Figure 4:
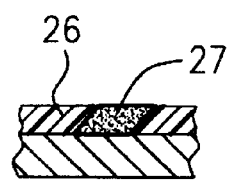

By means of the movement of the belt, the substrate now travels further and the layer reaches in between the belt, where it travels against the pressure roller 4, and the heated cylinder 3. The cylinder 3 is heated to such a high temperature that the material in the layer is completely fused during simultaneous compression between the tightly strained substrate belt and the cylinder 3. In order to provide the plastic layer with a final stabilization it is brought further past the cooling cylinder 5. The now formed, solid layer is denoted 26 in FIGS. 1 and 4. After the nip between a breaking-off roller 9 and the belt 1, which is led around one of the rollers 2, this layer 26 is separated from the substrate 1 and the material web formed in this way is brought further for possible finishing and reeling into delivery condition.

The described method may be varied in different ways. It is fundamental to the method that the raw material by means of a doctor blade or another depositing member is deposited as a layer of spherical particles on a movable substrate, and that the particle layer thereafter is fused into a homogeneous web by means of heating. This solidification is preferably done by means of compressing the particle layer between surfaces, of which at least one is heated. In the embodiment, this is stated to take place between the surface of a belt, constituting a substrate, which carries the layer, and a heated cylinder. However, the device may be equipped with a plurality of rollers, or the shown heated cylinder may be replaced with a second belt, which is pressed against the first, constituting the substrate.

Independently of how the compression takes place, there is a risk that the particles in the layer are displaced in an undesired way during the compression. Therefore, it may be advantageous to let the compression be preceded by a certain consolidation of the particles, which may occur by means of sintering, i.e. fusion of the material in the particle boundaries, so that the particles are joined together, however without forming a solid layer. Such a step is mentioned in the embodiment, where a heating to sintering takes place in a heated chamber with hot air or another type of heating, such as irradiation with infrared light. However, it is not excluded that compression during fusion to a solid layer may occur without such preceding sintering and the realization in such a way is also embraced by the invention.

The method may also be varied within the scope of the invention, so that the formation of a solid layer does not take place by means of compression but solely by means of heating. Depending on how far the heating is pursued, a more or less homogenous layer can thus be obtained. With a heating of short duration, the joining together of the particles may primarily only involve a sintering, so that cavities are formed between the particles, whereas a heating of relatively long duration at a higher temperature may result in a fusion, so that the layer becomes completely homogeneous.

It has been described above how a layer, constituting the web material, is produced with the spherical particles as a starting point. However, it may happen that the production of a material which is to consist of several layers is desired, preferably such which have mutually different properties. It is common, particularly for floor covering materials, that the supporting layer is designed with a certain thickness, herein assumed to be manufactured by means of the described method, with a top layer, providing advantageous wear and cloaning properties to the covering material. Accordingly, this top layer is often transparent so that the appearance of the main layer comes into view. Also such a layer may be applied according to the same method and then preferably in a thinner layer, by means of particles which form a transparent layer. Naturally, different methods for applying layers with different properties may also be combined. For instance, a top layer can advantageously be coated onto the formed main layer, or be sprayed on the same.

If the application of several layers on the same support by means of the described method according to the invention is desired, they may be applied in turn after the underlying layers have been stabilized by means of sintering by heating. Alternatively, several complete processes, comprising solidification by means of final heating of the layers in turn, may be utilized, so that each new layer is applied with the preceding one as a substrate. Thereby, the product may be provided with special properties, for example with regard to sound or heat insulation.

As mentioned by way of introduction, it is often desired to design covering materials of this type with a certain patterning. The patterning may be created by means of colour elements or a relief in the surface. The most advanced pattern shape is achieved if a colour pattern and a relief pattern are allowed to magnify each other.

A relief patterning may be done in a previously known way by embossing cylinders with an engraved relief. The heated cylinder mentioned in the embodiment may be such an embossing cylinder.

When colour patterning is concerned, the method according to the present invention provides several possibilities, of which some must be regarded as new and particularly connected to this method. Principally, a colour patterning may take place in accordance with the following basic principles:

A. Depositing particles of divergent colour and shape into the particle layer formed after the feeding device, said particles being, for example in the form of flakes, spherical or rugged particles of such a size that they can create a pattern element visible to the eye. This is illustrated by means of showing a pattern element in the form of a larger, non-spherical particle 27 i FIGS. 2–4. Because of the mobility of the particles in the layer, the pattern bodies will sink down into this right up to the moment of sintering phase and at a very low resistance from the particle mass, compare FIGS. 2, 3. They are united with the particles when fusing the layer therewith, compare FIG. 4, and are forming a pattern element deviating from the background formed by the particle mass.

B. Using a substrate with recessed portions in which particles, which may form pattern elements for example by means of having a divergent colour, are deposited before the formation of the evenly passing particle layer.

C. Mixing particles of different colours when supplying the particle mass to the feeding unit. Since it may be assumed that the particles must be so small that they are not visible as separate elements, an intimate mixing of different-coloured particles would probably not result in any real pattern formation but only in a mottling.

D. However, in order to achieve a more accentuated pattern formation by means of particles with different colours, the particles may be fed selectively from each other. Particles of different colours may, for example, be added in layer after layer into the trough of the device, so that a diffuse streak transverse formation is achieved in the particle layer when these layers in turn are deposited on the substrate. Another possibility is to divide the trough into sections, into which particles of different colours are fed. Thereby, a streak formation in the longitudinal direction of the finished material may be achieved.

E. Furthermore, previously known methods for patterning may be used, such as printing with different methods; screen printing is a commonly used method for decorating web materials. Thereby, the printing may be done on the layer, when it partly has been solidified by means of its sintering, or on the surface of the completely solidified layer.

The expression substrate has been used for the surface onto which the particle layer is deposited while the substrate is brought past the down-feed site. Thereby, it has been assumed in the described embodiment that the substrate is constituted by a machine part, namely the earlier mentioned belt, and it is consequently not integrated into the finished product. Accordingly, the surface of the substrate must be such that it releases the plastic layer after its solidification. This may be achieved, for example, by means of the substrate being made of, or coated with tetrafluoroethylene (TEFLON®). In another method, previously known from the manufacture of plastic web materials, the surface of the substrate is formed by an auxiliary layer, a so-called release layer, for example a plastic film or a paper web, which is designed in such a way that its surface does not adhere to the formed material. Thereby, the auxiliary layer follows the product for a certain time period, but is thereafter separated from it. This separation may take place directly after the product has been finished, after which the auxiliary layer may be returned to the manufacturing process, or the auxiliary layer may follow the product as a protective layer until it is to be used by being laid onto a floor or being hung on, for example, walls.

The third possibility is that the substrate is constituted by a bottom layer in the product. This is very common in floor materials, where a fibre web is allowed to constitute a contact layer against the support. In the manufacturing process, however, this bottom layer in turn must be supported in the machine. All these forms fall within the conceivable alternative embodiments of the invention.

EXAMPLE

The particles are manufactured in a spherical shape in one single dimension with relatively narrow tolerances. This dimension should be within the range 0.2–2 mm. The raw material should be a thermoplastic, such as polypropylene, or a mixture of plastics and preferably also ingredients such as pigments, fillers etc. The particles are deposited in such a layer on the substrate that a web material with the thickness 0.5–5 mm is formed after solidification.

What is claimed is:

1. Method for manufacturing plastic-based materials in web form characterized by the following successive steps in combination:
   providing particles (12) of the plastic-based materials and being spherical and substantially of one dimension with narrow tolerances, thereby producing a mass formed by the free particles having high flowability and good compression ability at a low pressure due to the mobility of the spherical particles in relation to each other;
   arranging a particle mass feeding device (10) over a travelling substrate (1), the feeding device including a gap (15) extending across the substrate;
   depositing the particles onto the traveling substrate by letting them flow out of said gap by utilizing the flowability of the particle mass;
   providing that the particles are forming a layer (18) of predetermined thickness on the substrate by means of doctoring; and
   solidifying of the layer by means of heating so that the particles are united to form the material web (26).

2. Method according to claim 1, characterized in that the particles, after the deposition of the particle mass (12) onto the substrate (1) are sintered together by heating, whereafter the layer which solidified (25) in this way is caused to fuse into a homogenous form by means of heating in order to form the web material (26).

3. Method according to claim 2, characterized in that a compression is effected simultaneously with a feeding.

4. Method according to claim 1, characterized in that the material is patterned by means of applying bodies (27), having a larger size than the particles of the mass in the layer (18) deposited on the substrate (1), which pattern bodies (27) are integrated into the material during its homogenization.

5. Method according to claim 1, characterized in that a substrate (1), with recesses in its surface in which pattern-forming bodies are inserted in order to be homogenized and united with the particle layer during its formation of the layer, is used for patterning the material.

6. Device for carrying out the method according to claim 1 for manufacturing a plastic-based material in web form by means of depositing particles (12) on a substrate (1), whereafter the layer is homogenized by means of heating and compression, characterized by in combination:
   a particle providing device provided to provide a mass of spherical particles (12) of substantially one dimension with narrow tolerances, thereby obtaining a mass formed by the free particles is having high flowability and good compression ability at a low pressure due to the mobility of the particles in relation to each other;
   a substrate provided to travel in a predetermined direction;
   a feeding device for the particle mass including a reception means (11) for the particle mass ending in a gap (15) over the substrate and extending across the same, the feeding device being provided to form a channel for letting the particles flow out of the gap onto the substrate by utilizing the flowability of particle mass;
   over the substrate doctoring means (16) provided to form a layer (18) of predetermined thickness on the substrate; and
   a heating device, which heating device (20, 3) is arranged to solidify the particle layer by means of heat, and to homogenize it by means of compression and further heating.

7. Device according to claim 6, characterized in that the heating device is constituted of a device (20) which is arranged to achieve the solidification of the particle layer (18) by means of sintering, and also of at least one heated cylinder (13) and members (4) for pressing the substrate, with the particle layer lying in between, against the cylinder, so that the layer by means of heating from the cylinder and during simultaneous compression against said cylinder is homogenized in order to shape the material (26).

8. Device according to claim 7, characterized in that the substrate, constituting a support for the material, is in the form of an endless belt (1), which is arranged to move, in turn, past the particle feeding device (10), through the heating device (20) for sintering the particles together while stretched around a portion of the heated cylinder (3), and to a separating device (9), arranged to separate the homogenized material from the substrate, which is brought further in its course past the particle feeding device.

9. Method according to claim 3, characterized in that the sintering is performed by means of the heating of the particle mass by heat radiation, and that the homogenization is done by means of inserting the layer (25) of particles sintered together, in between a surface and the surface of a counter-pressure member (1, 4) during heating and compression.

10. Method according to claim 9, in which the homogenization is done by means of inserting the layer (25) of particles sintered together in between a roller and the surface of a counter-pressure member.

11. Method according to claim 1, characterized in that the spherical particles are all within a range of 0.2–2 mm.

12. Device according to claim 7, characterized in that device (20) is a heat radiation device.

* * * * *